Nov. 27, 1962 G. D. ARNOLD 3,066,214
ELECTRIC WATER HEATER
Filed Sept. 18, 1959 2 Sheets-Sheet 1

George D. Arnold
INVENTOR.

Nov. 27, 1962 G. D. ARNOLD 3,066,214
ELECTRIC WATER HEATER

Filed Sept. 18, 1959 2 Sheets-Sheet 2

George D. Arnold
INVENTOR.

United States Patent Office 3,066,214
Patented Nov. 27, 1962

3,066,214
ELECTRIC WATER HEATER
George D. Arnold, 350 W. 2nd St., Peru, Ind.
Filed Sept. 18, 1959, Ser. No. 840,899
4 Claims. (Cl. 219—38)

This invention relates to electric water heaters and more particularly to an electric water heater which may be used in a number of capacities.

Briefly, an electric water heater in accordance with the invention is equipped with a plurality of heating elements of the immersion type, each of which is controlled by a relay. The heating elements and relays are conventional, and the electrical circuit arrangement is such that the relays individually are controllable in accordance with the B.t.u. per hour output required of the heater.

The principles of the invention may be used in connection with furnishing domestic hot water, factory use, swimming pools or wherever hot water is desired. It may also be used as a water heating boiler which can be connected to radiation of any steam or water type.

There are two main features of the invention, although there are numerous collateral features of importance. The individual control of the various immersion type heating elements is deemed significant, and the structural arrangement of the heater body is also considered to be unique.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2:
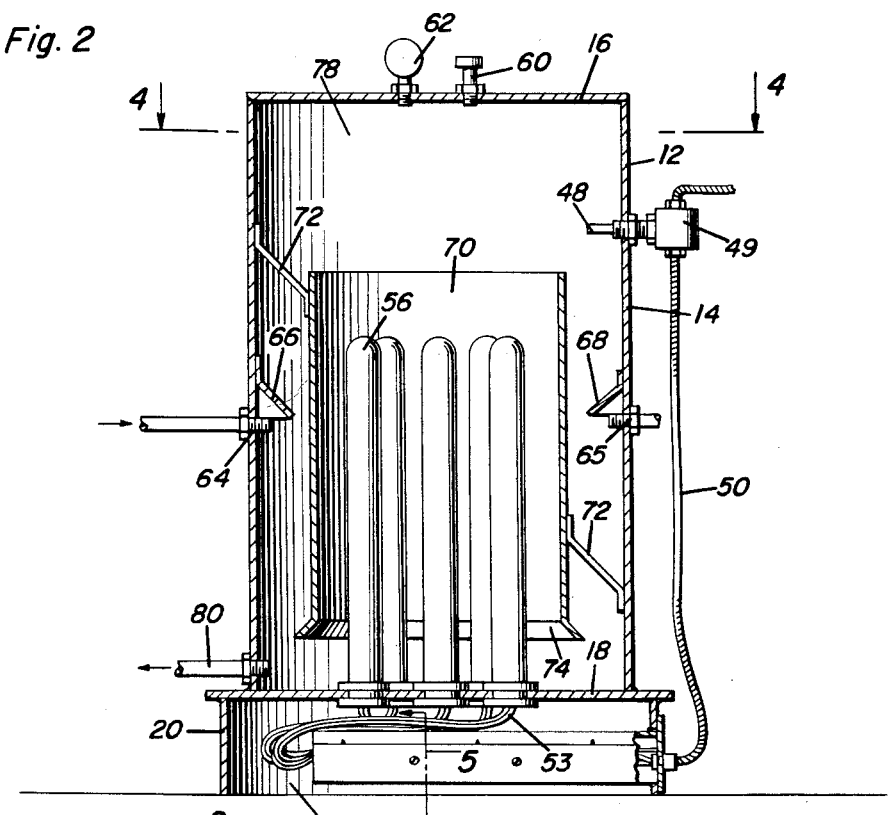
FIGURE 2 is a sectional view taken on the line 2—2 of FIGURE 1.
Figure 1:
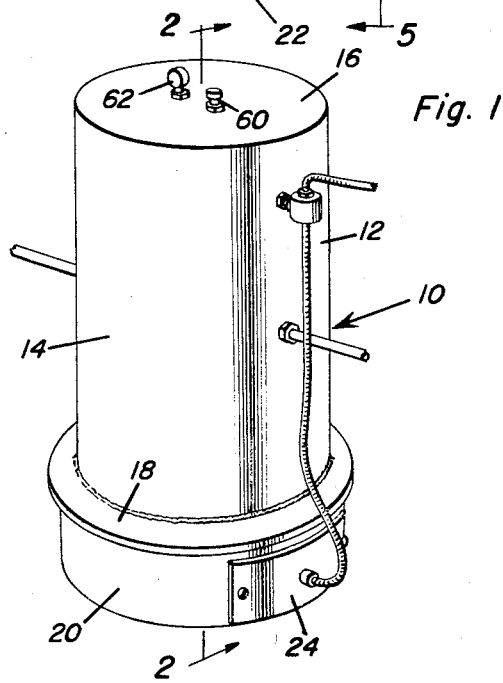
FIGURE 1 is a perspective view of a heater in accordance with the invention.
Figure 3:
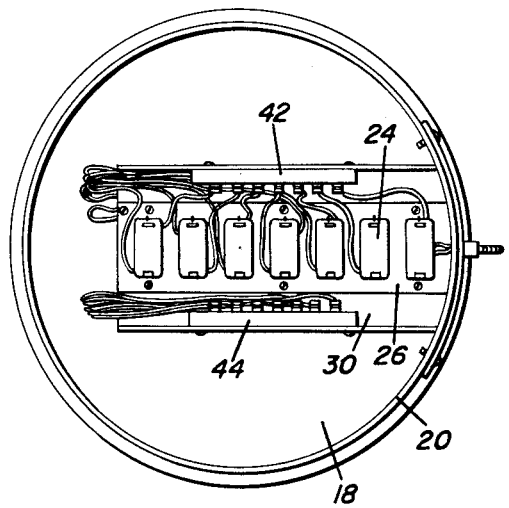
FIGURE 3 is a bottom view of the heater.
Figure 4:
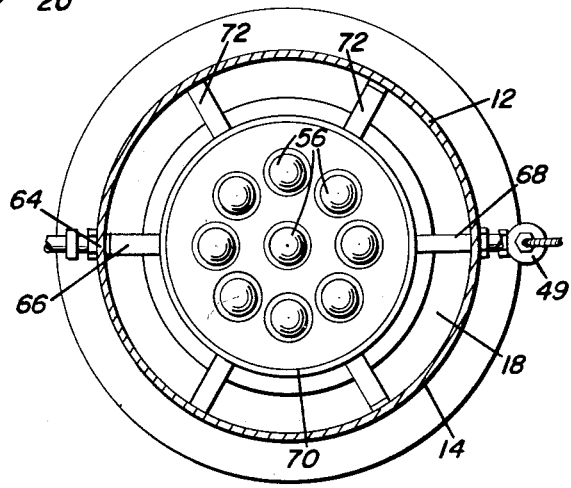
FIGURE 4 is a sectional view taken on the line 4—4 of FIGURE 2.
Figure 5:
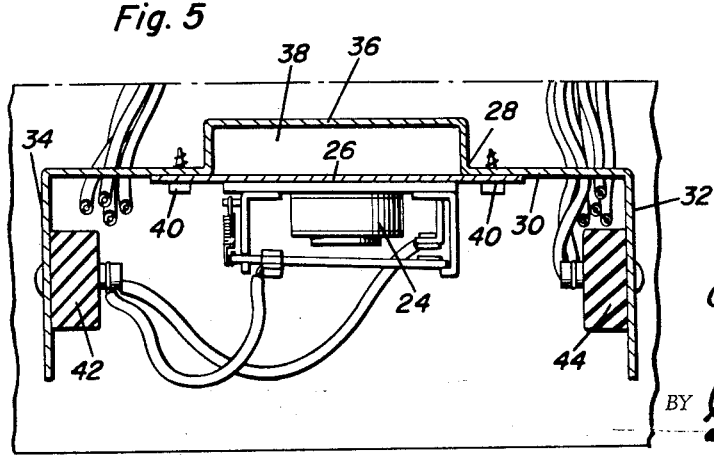
FIGURE 5 is an enlarged cross sectional view taken on the line 5—5 of FIGURE 2.

In the accompanying drawings heater 10 is illustrated as one possible form of the invention. Although unshown, the water jacket 12 may be a multi-wall jacket with conventional insulation therebetween. The water jacket has a cylindrical side wall 14, a top wall 16 and a bottom wall 18 welded to the lower edge of the side wall. A cylindrical leg 20 is welded to the bottom surface of wall 18 and forms a stand on which the heater is supported. It also encloses a cavity 22 in which a portion of the electrical controls for the heater is housed. This portion is essentially a bank of relays 24 carried by a relay supporting plate 26 secured to inverted drawer 28. The inverted drawer has a top wall 30 and two side walls 32 and 34 joined to the edges thereof and depending from the top wall 30. Further, the top wall has an inverted channel 36 formed therein thereby enclosing an insulation chamber 38 directly beneath which the relay bank supporting plate 26 is secured, for instance by screws 40 or like conventional fasteners. Two insulation blocks 42 and 44 are secured by fasteners to the inside surfaces of walls 32 and 34 thereby positioning the insulation blocks within the inverted drawer. These blocks contain a number of terminals for the wiring that operatively connect with the relays. It is pointed out that the relays themselves are commercially available and conventional, and the wiring thereof is such that a comparatively low command voltage is conducted from the multiple thermostat or multiple position thermostat 48 through the multi-strand cable 50. This comparatively low voltage-low amperage circuit energizes the coils of the relays causing them to close in which case comparatively high current flows from the switch sections of the relays to the group of immersion heaters 56 contained within jacket 12.

Thermostatic or heat sensory device 49 containing the thermostatic element or elements, is attached to the side wall 14 of the water jacket so that the sensory elements are located therein.

The heating elements are secured to the bottom wall 18 and have conductors (FIGURE 2) 53 extending therefrom which are operatively connected with the switch sections of the relays.

Referring now to the internal structure of the jacket, top wall 16 has a hot water outlet fitting 60 connected therewith, and a pressure valve 62 conveniently placed in the region thereof. One or more water inlets 64 and 65, for example, are in the side wall 14 at a low temperature zone and they are adapted to connect with one or more sources of water under pressure. They may be alternately used i.e. one capped, or both used simultaneously. In either case, there are shields made of deflector plates 66 and 68 secured within the jacket and projecting downwardly and inwardly toward the longitudinal center line of the jacket so as to deflect the water downwardly as it enters the jacket. Cylindrical baffle 70 supported by struts 72 that are secured to side wall 14 and the cylindrical jacket, is located within the jacket in spaced relation to the top and bottom and surrounds the heating elements 56. A portion of the baffle protrudes above the top ends of the heating elements 56, and an outwardly flared mouth 74 of baffle 70 is vertically spaced from wall 18. As water enters one or both of the water inlet ports, it is required to flow downwardly to the bottom of the jacket and then it flows upwardly around the heating elements 56 to the top high temperature region 78 of the water jacket with which water outlet fitting 60 communicates. Drain 80, equipped with a drain cock (not shown) is at the lower intermediate temperature region of the jacket for flushing purposes. It will therefore become apparent that a constant circulation of water will occur in view of the colder inlet water passing downwardly through the annular passage formed between the side wall 14 and the baffle member 70 and then upwardly along the length of the heating elements 56. Such circulation will always occur even when the heating elements are not operative so as to provide a warmer body of water adjacent to the outlet 60. When the heating elements are operative, the circulation increases in speed. The flared portion 74 on the baffle member 70 will be effective to cause outward swirling of the colder inlet water for better transitional mixing with warmer water before contacting the heating elements and will also prevent any back circulation of warmer water upwardly through the annular passage. Also, the circulation of cooler water in the annular passage about the warmer water will prevent condensation on the side wall 14 and the deleterious effects thereof on the heater apparatus.

In operation the temperature requirements for the water are met by the energization of one, two or more of the heating elements depending on the command voltage or voltages of the thermostat device 49. For instance, if the water is to be discharged or maintained in region 78 at a predetermined temperature level, one section of the thermostat may command by way of the voltage, with only one relay closed. If a few degrees hotter water is desired, perhaps two or three additional thermostat sensors will produce a voltage to close two or three additional relays. The maximum demand causes thermostatic device 49 to transmit voltage signals to all of the relays thereby energizing all of the available heating elements 56.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A heater comprising a jacket, said jacket having a side wall, a top wall and a bottom wall, a plurality of immersion type electric heating elements located in said jacket, an electric circuit including a plurality of relays operatively connected with the heating elements individually to control individual heating elements, a thermostatic device operatively connected with the jacket and with the relays to supply command voltages to the relays in accordance with the temperature level of water in the jacket and circulatory means mounted within said jacket effective to circulate downwardly moving cooler water about upwardly moving warmer water in contact with the heating elements, a baffle disposed in said jacket and spaced from the bottom and top walls thereof and surrounding portions of said heating elements to form an annular passage for the cooler water, a drawer, leg means supporting said bottom wall of said jacket and cooperating therewith to define a cavity within which said drawer is located, and said relays carried by said drawer so that said relays are removable together with said drawer by separating the drawer at least partially from said leg means.

2. The subject matter of claim 1 including a water inlet port connected with said jacket wall at a position spaced from the upper and lower walls of the jacket, and a water deflector extending inwardly and downwardly within said annular passage and located adjacent to said inlet port to deflect the water downwardly of the jacket as it enters said jacket.

3. A heater comprising, enclosed water jacket means, elongated heater means vertically disposed in said jacket means and mounted on a bottom thereof, passage means mounted coaxially within the heater means in spaced relation to said bottom to define therebelow an intermediate temperature zone operative to continuously induce downward flow of water from a low temperature zone in an annular passage formed about upwardly flowing water in a central passage within which the heater means is disposed, temperature responsive means mounted within the jacket means in a high temperature zone above the passage means, control means operatively connected to the temperature responsive means and heater means below the bottom of the jacket means for selectively rendering the heater means operative to increase the temperature of the water and the circulating flow thereof, water inlet means operatively connected to the passage means intermediate upper and lower ends of the annular passage in the low temperature zone to maintain thermal flow of water when the heater means is inoperative, and transition means in the immediate temperature zone connected to the passage means to form a restriction at a bottom of the annular passage causing swirling of the water flowing therefrom and preventing upward flow through the annular passage.

4. A continuously circulating liquid heating apparatus comprising, liquid chamber means having an upper high temperature region, a lower intermediate temperature region and an intermediate low temperature region, annular passage means of uniform cross-section mounted within the intermediate low temperature region to define an outer downward flow passage and an inner upward flow passage, transition flow controlling means operatively connected to the passage means and disposed in the lower intermediate temperature region for preventing upward flow in the outer flow passage and enhancing reverse flow turbulence of the liquid for rapid heat distribution thereto, vertically elongated heating means disposed in said lower intermediate temperature region and said inner flow passage operative to elevate the temperature of the liquid and increase the circulatory flow thereof between and through said outer and inner flow passages, means responsive to the temperature of the liquid in the upper high temperature region for rendering said heating means operative and water inlet means connected to the liquid chamber means in the low temperature region intermediate the intermediate temperature and high temperature regions.

References Cited in the file of this patent

UNITED STATES PATENTS

| 1,184,430 | De Khotinsky | May 23, 1916 |
| 1,436,247 | Hagan | Nov. 21, 1922 |
| 1,442,048 | Christian | Jan. 16, 1923 |
| 1,451,671 | Cartter et al. | Apr. 10, 1923 |
| 1,692,646 | Gannon et al. | Nov. 20, 1928 |
| 1,787,450 | Lonergan | Jan. 6, 1931 |
| 1,876,053 | Hyde | Sept. 6, 1932 |
| 1,886,135 | Tannehill | Nov. 1, 1932 |
| 2,224,131 | Bailey | Dec. 10, 1940 |
| 2,456,698 | Hall | Dec. 21, 1948 |
| 2,636,974 | Bowen | Apr. 28, 1953 |
| 2,763,764 | Vidalenq | Sept. 18, 1956 |
| 2,804,534 | Coates | Aug. 27, 1957 |
| 2,834,865 | Coates | May 13, 1958 |

FOREIGN PATENTS

| 107,655 | Great Britain | July 11, 1917 |
| 341,482 | Great Britain | Jan. 16, 1931 |